United States Patent
Hirt et al.

(10) Patent No.: US 10,296,363 B2
(45) Date of Patent: May 21, 2019

(54) TUNING A VIRTUAL MACHINE STARTUP PARAMETER

(71) Applicant: Oracle International Corporation, Redwood City, CA (US)

(72) Inventors: Marcus Mattias Hirt, Kussnacht am Rigi (CH); Joseph Bernard McGlynn, Scotts Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 251 days.

(21) Appl. No.: 15/268,432

(22) Filed: Sep. 16, 2016

(65) Prior Publication Data

US 2018/0081704 A1 Mar. 22, 2018

(51) Int. Cl.
*G06F 9/455* (2018.01)
*G06F 11/34* (2006.01)

(52) U.S. Cl.
CPC ...... *G06F 9/45558* (2013.01); *G06F 11/3409* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 7,890,951 B2* | 2/2011 | Vinberg | G06F 8/65 709/203 |
| 8,261,266 B2* | 9/2012 | Pike | G06F 9/44505 709/223 |
| 8,566,835 B2* | 10/2013 | Wang | G06F 9/5077 718/104 |
| 8,788,986 B2* | 7/2014 | Zink | G06F 11/3442 716/101 |
| 8,914,511 B1* | 12/2014 | Yemini | G06Q 10/06 709/226 |
| 8,918,510 B2* | 12/2014 | Gmach | G06F 9/50 709/226 |
| 8,990,829 B2* | 3/2015 | Blythe | G06F 11/3409 709/224 |
| 9,027,011 B1* | 5/2015 | Lam | G06F 9/44505 717/158 |
| 9,189,410 B2* | 11/2015 | Luo | G06F 12/0842 |
| 9,262,190 B2* | 2/2016 | Gombert | G06F 9/45533 |

(Continued)

*Primary Examiner* — Hiren P Patel
(74) *Attorney, Agent, or Firm* — Invoke

(57) ABSTRACT

Techniques for tuning a virtual machine (VM) startup parameter are disclosed. A network manager initiates VMs, for executing a program, using an initial set of values for VM startup parameters. A VM analysis engine determines performance characteristics for the execution of the program associated with the initial set of values. Based on the performance characteristics, the VM analysis engine selects a modified set of values for the VM startup parameters. The network manager initiates VMs using the modified set of values for the VM startup parameters. The VM analysis engine determines performance characteristics for the execution of the program associated with the modified set of values. If the performance characteristics are improved, the network manager initiates new VMs using the modified set of values for the VM startup parameters. The network manager redirects traffic to the new VMs and terminates existing VMs associated with the initial set of values.

22 Claims, 11 Drawing Sheets

(56) References Cited

U.S. PATENT DOCUMENTS

| | | | |
|---|---|---|---|
| 9,262,502 B2* | 2/2016 | Kunde | G06F 17/30589 |
| 9,411,622 B2* | 8/2016 | Zhu | G06F 9/45533 |
| 9,444,886 B2* | 9/2016 | Rahman | H04L 67/1012 |
| 9,503,310 B1* | 11/2016 | Hawkes | H04L 41/00 |
| 9,582,132 B1* | 2/2017 | Adelman | G06F 9/453 |
| 9,690,709 B2 | 6/2017 | Sandoz et al. | |
| 9,800,466 B1* | 10/2017 | Rangole | H04L 41/0823 |
| 9,852,011 B1* | 12/2017 | Yemini | G06F 9/5083 |
| 9,860,309 B2 | 1/2018 | Doctor et al. | |
| 9,921,864 B2* | 3/2018 | Singaravelu | G06F 9/45537 |
| 10,152,340 B2* | 12/2018 | Sivathanu | G06F 12/0868 |
| 2005/0120341 A1* | 6/2005 | Blumenthal | G06F 11/3428 717/158 |
| 2005/0223362 A1* | 10/2005 | Whitlock | G06F 11/3672 717/126 |
| 2007/0180096 A1* | 8/2007 | Roth | G06F 11/3688 709/223 |
| 2009/0070776 A1* | 3/2009 | Dahlstedt | G06F 9/5016 719/312 |
| 2009/0265707 A1* | 10/2009 | Goodman | G06F 9/5016 718/1 |
| 2012/0233435 A1* | 9/2012 | Ben-Yehuda | G06F 9/5022 711/170 |
| 2012/0233609 A1* | 9/2012 | Blythe | G06F 11/3409 718/1 |
| 2012/0330711 A1* | 12/2012 | Jain | G06F 9/5072 705/7.23 |
| 2013/0167147 A1* | 6/2013 | Corrie | G06F 9/45558 718/1 |
| 2014/0068053 A1* | 3/2014 | Ravi | G06F 9/5072 709/224 |
| 2014/0215464 A1* | 7/2014 | Birke | G06F 9/45533 718/1 |
| 2014/0344504 A1* | 11/2014 | Luo | G06F 12/0842 711/103 |
| 2014/0380307 A1* | 12/2014 | Zhu | G06F 9/45533 718/1 |
| 2015/0026429 A1* | 1/2015 | Bobroff | G06F 12/0253 711/171 |
| 2015/0142951 A1* | 5/2015 | Bragstad | G06F 9/45533 709/224 |
| 2015/0154100 A1* | 6/2015 | Perira | G06F 11/3644 717/130 |
| 2015/0254000 A1* | 9/2015 | Sivathanu | G06F 12/0868 711/103 |
| 2016/0103697 A1* | 4/2016 | Bragstad | G06F 9/45558 718/1 |
| 2016/0156567 A1* | 6/2016 | Miyahara | H04L 12/4641 709/226 |
| 2016/0253192 A1* | 9/2016 | Singaravelu | G06F 9/45537 718/1 |
| 2016/0344657 A1* | 11/2016 | Nguyen | G06F 9/45533 |
| 2017/0039043 A1 | 2/2017 | Haupt et al. | |
| 2017/0078250 A1* | 3/2017 | Barsness | H04L 63/0428 |
| 2017/0163507 A1* | 6/2017 | Pai | H04L 43/08 |
| 2017/0199752 A1* | 7/2017 | Cao | G06F 9/45558 |
| 2018/0032347 A1 | 2/2018 | Haupt et al. | |
| 2018/0032355 A1 | 2/2018 | Haupt et al. | |

* cited by examiner

TUNING A VIRTUAL MACHINE STARTUP PARAMETER

TECHNICAL FIELD

The present disclosure relates to virtual machines. In particular, the present disclosure relates to tuning a virtual machine startup parameter.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
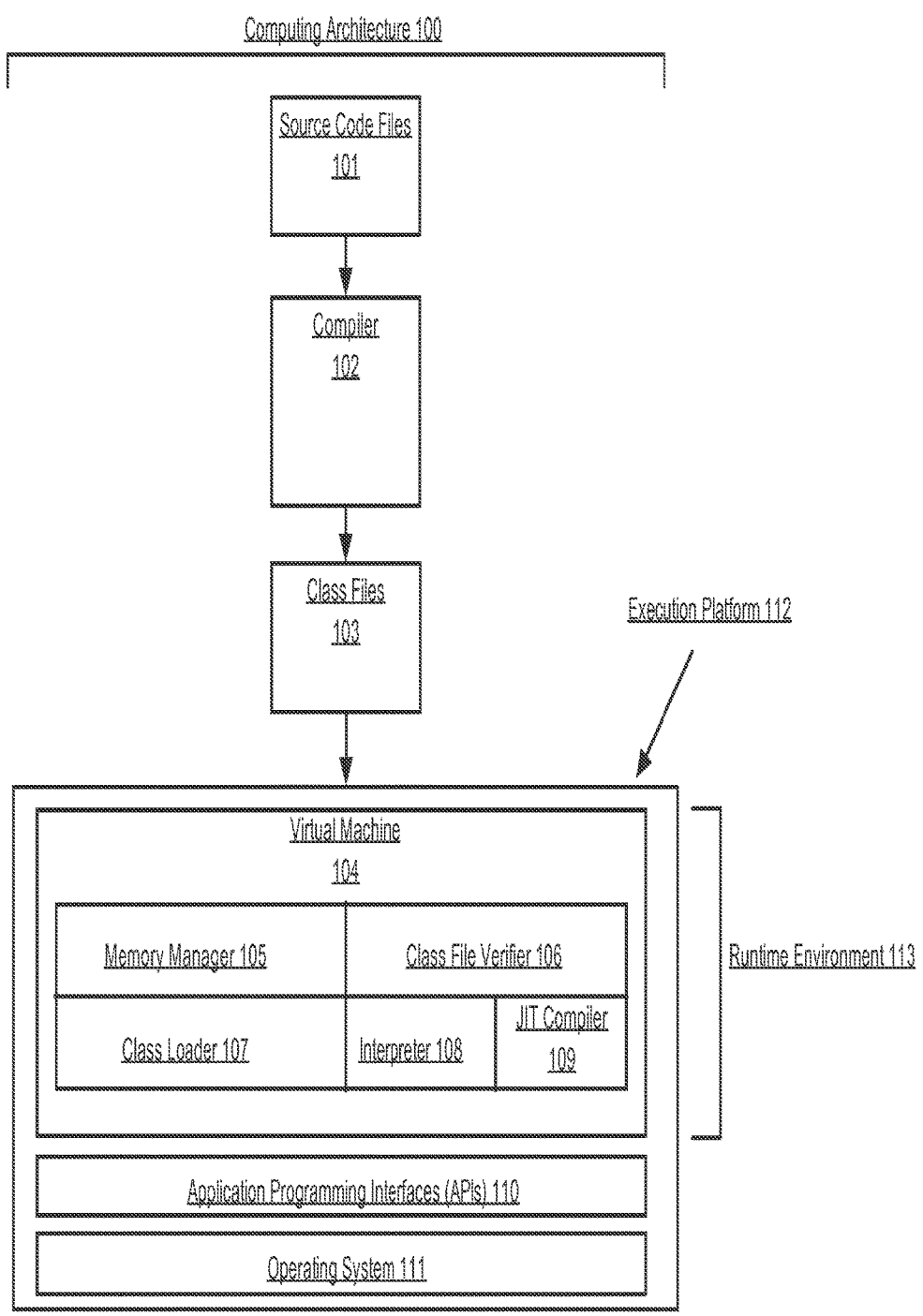
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. VIRTUAL MACHINE ANALYSIS ENGINE AND NETWORK MANAGER
4. TUNING A VIRTUAL MACHINE STARTUP PARAMETER
5. EXAMPLE EMBODIMENT
6. COMPUTER NETWORKS
7. MISCELLANEOUS; EXTENSIONS
8. HARDWARE OVERVIEW

1. General Overview

One or more embodiments include tuning a virtual machine (VM) startup parameter. A network manager initiates one or more VMs, for executing a program, using an initial set of values for VM startup parameters. A VM analysis engine determines performance characteristics for the execution of the particular program using the initial set of values for the VM startup parameters. Based on the performance characteristics, the VM analysis engine selects a modified set of values for the VM startup parameters. The network manager initiates VMs, for executing the program, using the modified set of values for the VM startup parameters. The VM analysis engine determines performance characteristics for the execution of the particular program using the modified set of values for the VM startup parameters. If there is an improvement in the performance characteristics, then the network manager initiates additional VMs using the modified set of values for the VM startup parameters. The network manager may redirect traffic from VMs using the initial set of values to VMs using the modified set of values. In contrast, if there is not an improvement in the performance characteristics, then the network manager terminates VMs using the modified set of values for the VM startup parameters. The network manager continues the execution of VMs using the initial set of values for the VM startup parameters.

In one or more embodiments, a VM startup parameter is a parameter for configuring a virtual machine itself, as opposed to configuring a program executing on the virtual machine. Examples of VM startup parameters include a heap size, a method area size, a stack size, a code cache size, a generation size, a garbage collection algorithm, and a page size.

In one or more embodiments, a performance characteristic is a characteristic relating to the execution of a program. A performance characteristic may be a numerical value, a Boolean value, a statistic, and/or a trend. Examples of performance characteristics include an amount of memory used in executing the program, a number of occurrences of a particular error and/or warning, an overflow of a heap, an overflow of a method area, an overflow of a stack, an overflow of a code cache, statistics regarding the promotion of objects from one generation to another generation in the heap, the latency in the execution of the program during garbage collection, and the throughput of the virtual machine while executing the program.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
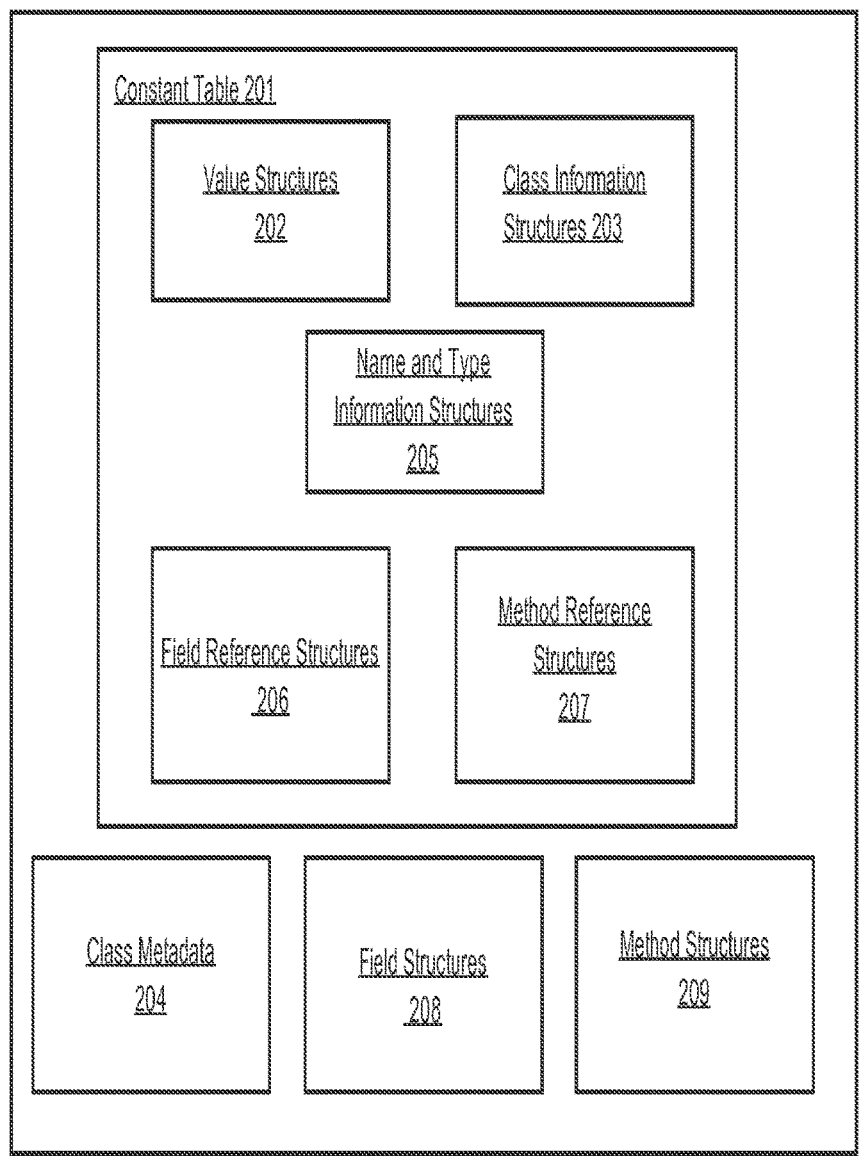
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
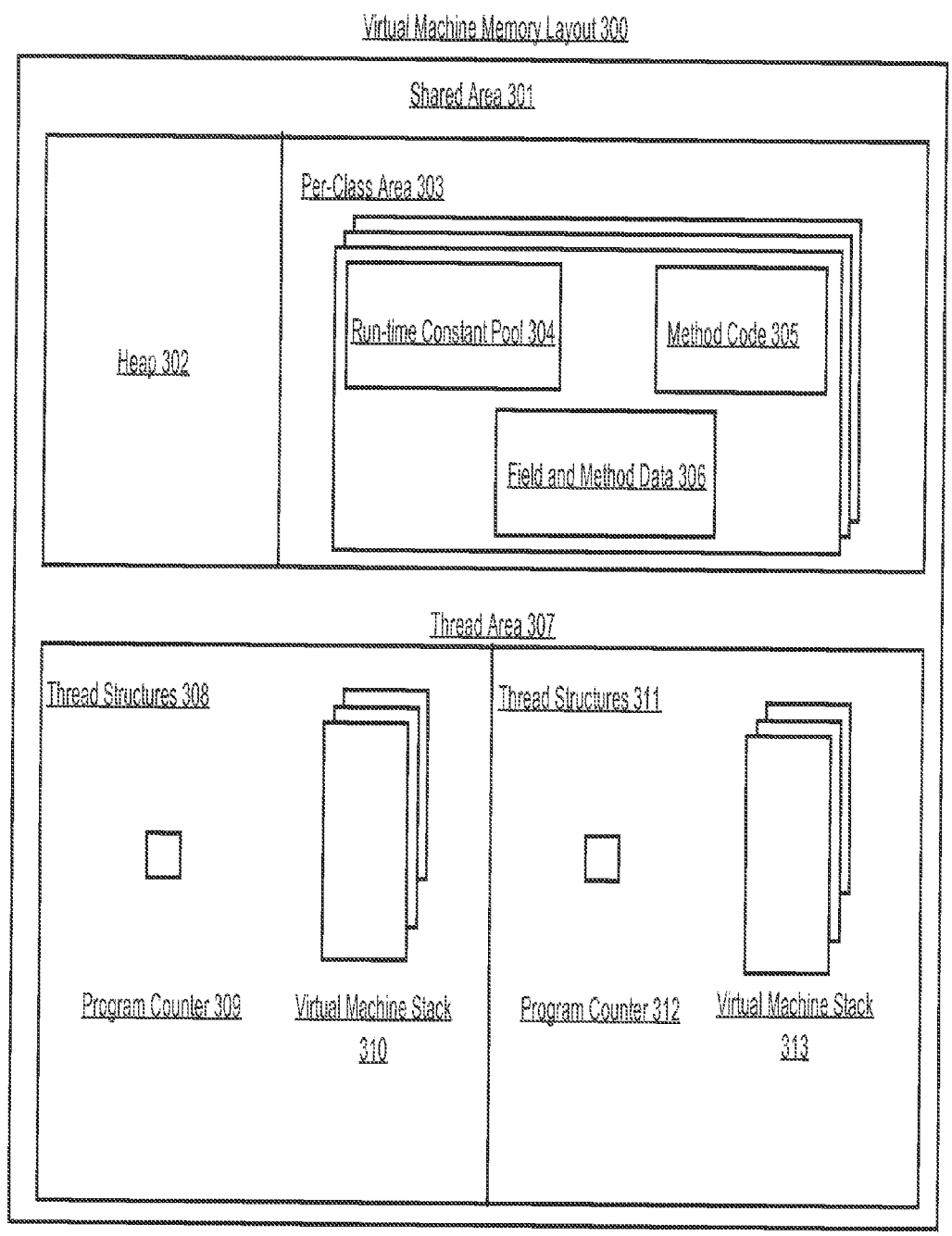
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 306 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
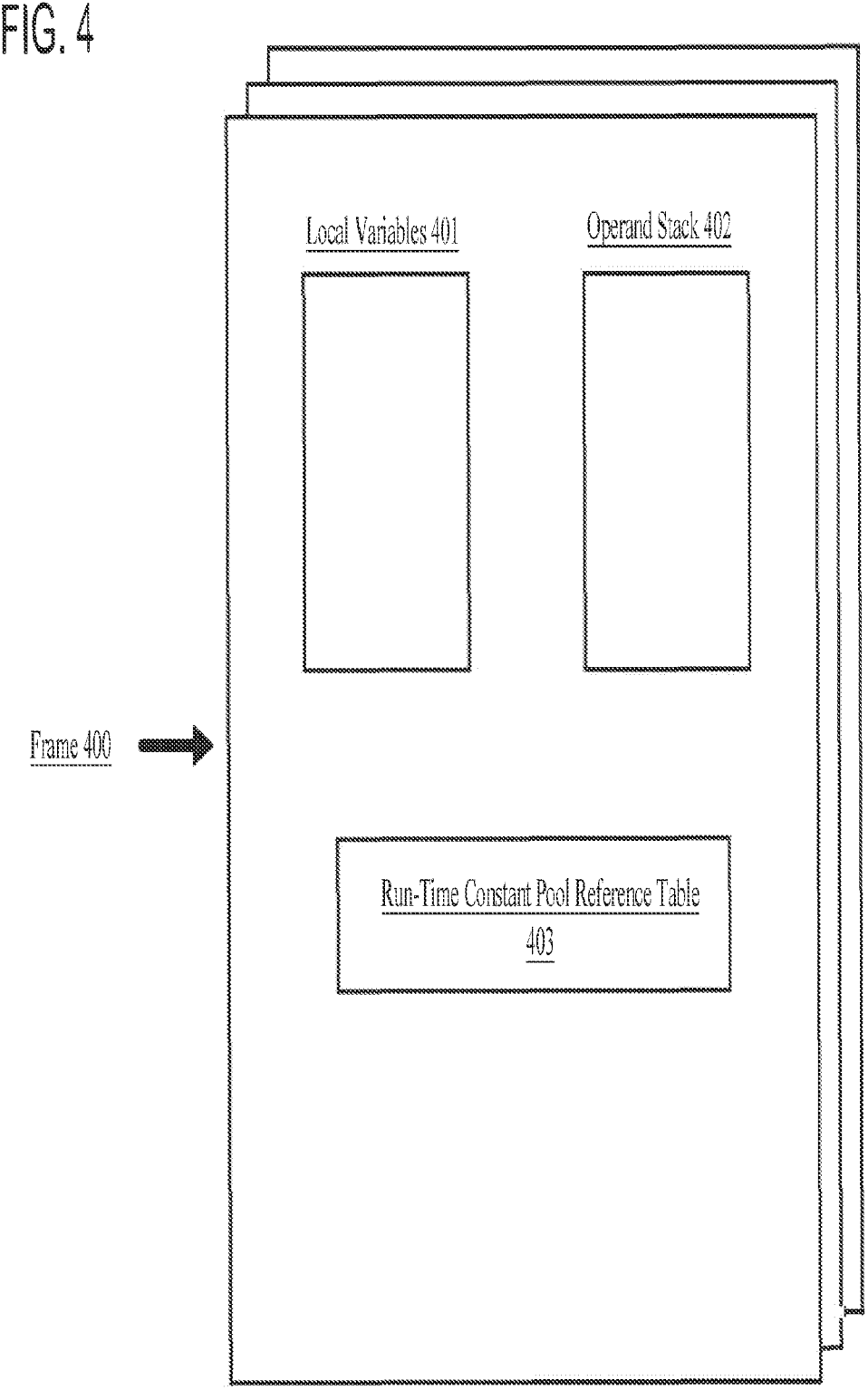
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 306 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Virtual Machine Analysis Engine and Network Manager

Figure 5A:
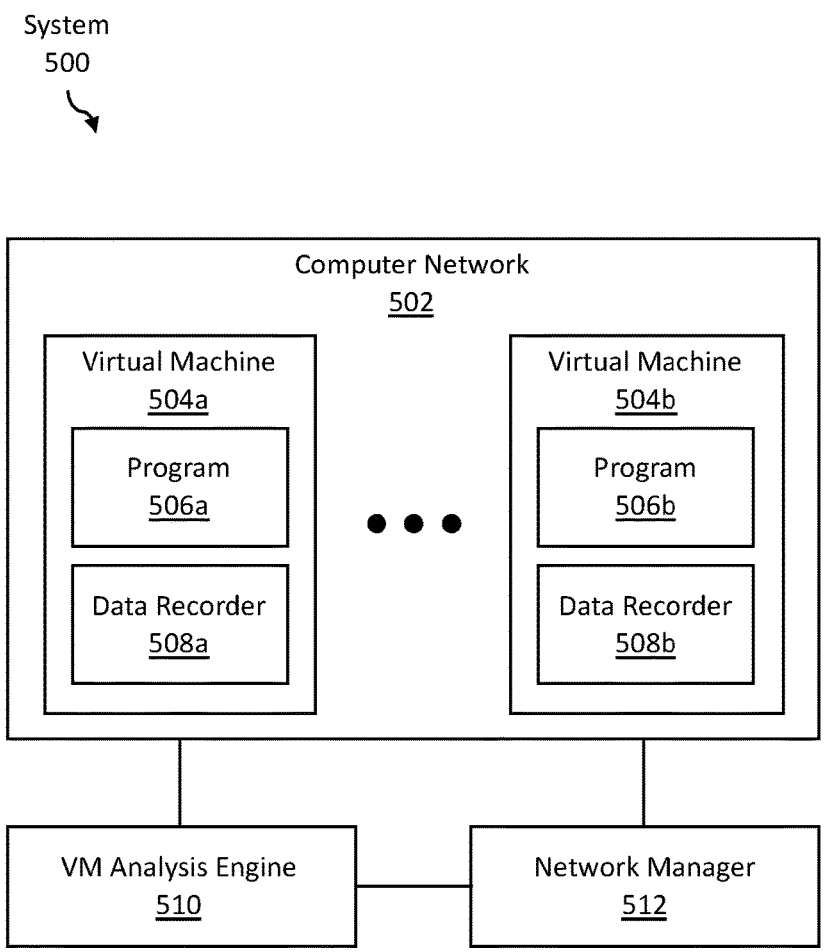
FIGS. 5A-B illustrate a system in accordance with one or more embodiments.
Figure 5B:
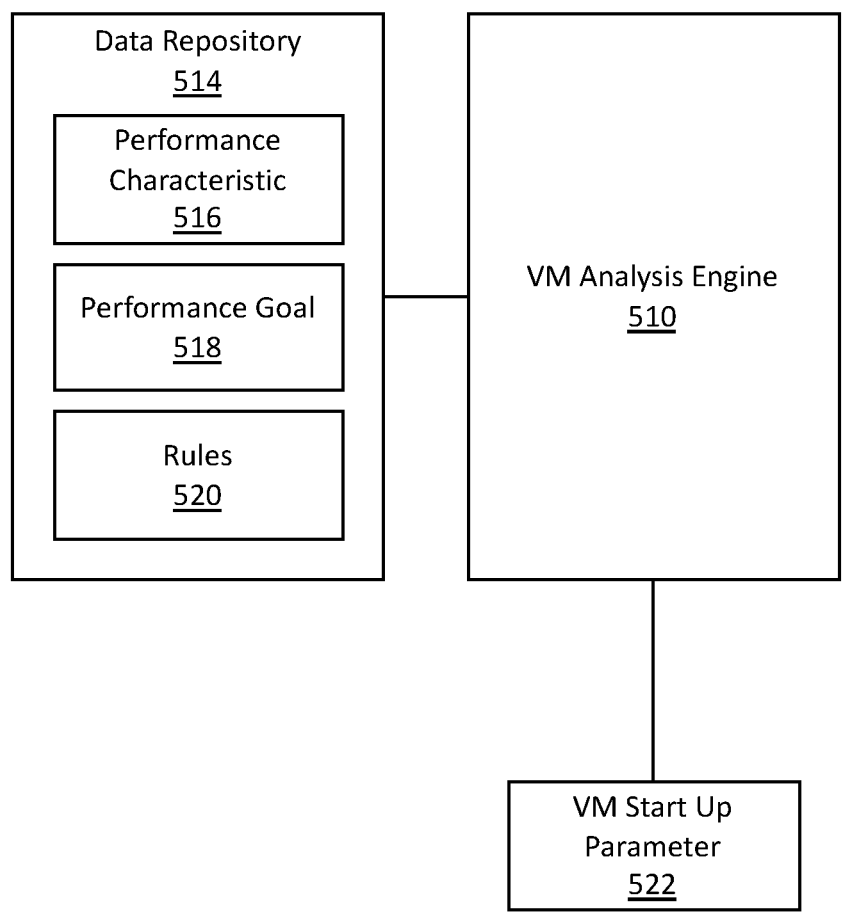

FIGS. 5A-5B illustrate a system in accordance with one or more embodiments. As illustrated, system 500 includes a computer network 502, a virtual machine (VM) analysis engine 510, and a network manager 512. The computer network 502 includes one or more VMs (such as VM 504a and VM 504b). In one or more embodiments, system 500 may include more or fewer components than the components illustrated in FIG. 5A. The components illustrated in FIG. 5A may be local to or remote from each other. The components illustrated in FIG. 5A may be implemented in software and/or hardware. Each component may be distributed over multiple applications and/or machines. Multiple components may be combined into one application and/or machine. Operations described with respect to one component may instead be performed by another component.

In one or more embodiments, a computer network 502 provides a pool of resources that are shared amongst multiple client devices. Examples of resources include a VM (such as VM 504a or VM 504b), a processor, a server, a data storage device, a platform, and/or a software application. Client devices may independently request computing services, such as server time and network storage space, as needed. The resources may be dynamically assigned to the requests and/or client devices on an on-demand basis.

In an embodiment, a computer network 502 is shared amongst multiple tenants (also referred to as "customers"). Each tenant is associated with one or more client devices for accessing resources of the computer network 502.

A virtual machine (such as VM 504a or VM 504b) is an emulation of a particular computer system. A VM included in the computer network 502 may be the VM 104 described above with reference to FIGS. 1-4. A VM included in the computer network 502 may be, for example, a Java Virtual Machine (JVM).

Multiple VMs of a computer network 502 may execute a same program and/or application. As illustrated, for example, program 506a and program 506b are a same program. VM 504a executes program 506a. VM 504b executes program 506b. Client devices and/or other devices may request computing services of the program from the computer network 502. A subset of requests may be directed to VM 504a. Another subset of requests may be directed to VM 504b.

Additional descriptions regarding computer networks 502 are included below in Section 5, titled "Computer Networks."

In one or more embodiments, a data recorder (such as data recorder 508a or data recorder 508b) is a tool for collecting runtime information about a VM and/or one or more programs executing on the VM. A data recorder may be associated and/or integrated with a particular VM. As illustrated, for example, data recorder 508a is associated with VM 504a. Data recorder 508b is associated with VM 504b.

A data recorder collects information about "events." Each event is associated with an identifier, a time stamp, and an optional payload. The payload includes information related to the event, such as, the CPU usage, and the heap size before and/or after the event. Various types of events may occur, such as a duration event, an instant event, and a sample event. A duration event takes some time to occur, and is logged when it completes. A user may set a threshold for duration events, so that only events lasting longer than the specified period of time are recorded. An instant event occurs instantly, and is logged right away. A sample event (also called requestable event) is logged at a regular interval to provide a sample of system activity. A user may configure how often sampling occurs.

In one or more embodiments, a VM analysis engine 510 refers to hardware and/or software configured to modify a VM startup parameter for execution of a program. The VM analysis engine 510 is described in more detail below with reference to FIG. 5B.

In one or more embodiments, a VM startup parameter 522 is a parameter for configuring a VM itself, as opposed to configuring a program executing on the VM. The following is some examples of VM startup parameters 522.

A VM startup parameter 522 may be a heap size. A heap size is a maximum size of a heap of a VM (such as heap 302 of FIG. 3).

A VM startup parameter 522 may be a method area size. A method area size is a maximum size of the per-class area of a VM (such as per-class area 303 of FIG. 3).

A VM startup parameter 522 may be a stack size. A stack size is a maximum size of a stack of a thread of a VM (such as virtual machine stack 310 of FIG. 3).

A VM startup parameter 522 may be a code cache size. A code cache size is a maximum size of a code cache that is used by a just-in-time compiler of a VM (such as JIT compiler 109 of FIG. 1).

A VM startup parameter 522 may be a generation size. A generation size is a maximum size of a particular generation in a heap of a VM. The garbage collector of the VM performs different garbage collection operations for each generation. Further, the garbage collector promotes objects from one generation to another generation. Examples of generations include a young generation, an old generation, and a permanent generation.

A VM startup parameter 522 may be a garbage collection algorithm. A garbage collection algorithm identifies unused objects in the heap of a VM and reclaims memory space storing the unused objects. Different garbage algorithms perform different operations to reclaim memory space. Examples of garbage collection algorithms include a copying collector, a mark-and-sweep collector, a serial garbage collector, a parallel garbage collector, a concurrent garbage collector, and a partially concurrent garbage collector.

A VM startup parameter 522 may be a page size. A page is a fixed-length contiguous block of virtual memory. A page is the smallest unit of data for memory management in a VM.

A value for a VM startup parameter 522 is determined by the VM analysis engine 510 based on one or more of the following: a performance characteristic 516, a performance goal 518, and/or one or more rules 520. Information describing a performance characteristic 516, a performance goal 518, and rules 520 may be implemented across any of components within system 500. However, this information is illustrated within a data repository 514 for purposes of clarity and explanation.

A data repository 514 is any type of storage unit and/or device (e.g., a file system, database, collection of tables, or any other storage mechanism) for storing data. Further, the data repository 514 may include multiple different storage units and/or devices. The multiple different storage units and/or devices may or may not be of the same type or located at the same physical site. Further, the data repository 514 may be implemented or may execute on the same computing system as the VM analysis engine 510. Alternatively or additionally, the data repository 514 may be implemented or executed within the virtual machine itself (such as, VM 504a and/or VM 504b). Alternatively or additionally, the data repository 514 may be implemented or executed on a computing system separate from the VM analysis engine 510. The data repository 514 may be communicatively coupled to the VM analysis engine 510 via a direct connection or via a network.

In one or more embodiments, a performance characteristic 516 is a characteristic relating to the execution of a program. A performance characteristic may be a numerical value, a Boolean value, a statistic, and/or a trend. Examples of performance characteristics include an amount of memory used in executing the program, a number of occurrences of a particular error and/or warning, an overflow of a heap (such as heap 302 of FIG. 3), an overflow of a method area (such as per-class area 303 of FIG. 3), an overflow of a stack (such as virtual machine stack 310 of FIG. 3), an overflow of a code cache (such as a cache used by JIT compiler 109 of FIG. 1), statistics regarding the promotion of objects from one generation to another generation in the heap, the latency in the execution of the program during garbage collection, and the throughput of the virtual machine while executing the program.

A performance characteristic 516 is determined by a data recorder associated with a VM. The data recorder may be considered a sub-component of the VM analysis engine 510. A performance characteristic 516 may include runtime information about a VM or a program executing on the VM that is determined during the execution of a program.

In one or more embodiments, a performance goal 518 is a selection of a particular objective that is prioritized over other possible objectives. The performance goal 518 may be obtained based on user input. Examples of performance goals 518 include responsiveness and throughput. Responsiveness refers to how quickly a program or application responds with a requested piece of data. Examples include how quickly a desktop user interface (UI) responds to an event, how fast a website returns a page, and how fast a database query is returned. Throughput focuses on maximizing the amount of work completed by a program or application in a specific period of time. Examples of how throughput may be measured include the number of transactions completed in a given time, the number of jobs that a batch program can complete in an hour, and the number of database queries that can be completed in an hour. Significant latencies (pause times) are not acceptable where responsiveness is a performance goal, but may be acceptable where throughput is a performance goal.

In one or more embodiments, a rule 520 is applied to one or more performance characteristics 516 in order to determine a VM startup parameter 522. A rule 520 may be preconfigured for the VM analysis engine 510. Additionally or alternatively, a rule 520 may be added and/or modified by a user. As an example, a rule may compare a particular performance characteristic to a threshold value. The rule may set a VM startup parameter to a particular value depending on whether the particular performance characteristic is greater than or less than the threshold value. As another example, a rule may map a particular performance characteristic to using a particular value for a VM startup parameter 522.

Different rules 520 may be applied based on the performance goal 518 that has been selected. Different rules 520 may utilize different threshold values. Additionally or alternatively, different rules 520 may analyze different performance characteristics 516. As an example, one rule may determine the amount of memory used by the execution of a program. Another rule may determine whether the number of occurrences of a particular error is above the threshold value of 500. Another rule may determine whether the number of occurrences of a particular error is above the threshold value of 1,000. This example illustrates three different rules.

In one or more embodiments, a network manager 512 refers to hardware and/or software configured to manage one or more resources of the computer network 502. The network manager 512 may, for example, initiate VMs for executing a particular program, specify values for VM startup parameters, terminate VMs, and direct and/or redirect traffic to a particular VM.

In one or more embodiments, a VM analysis engine 510 and a network manager 512 work in conjunction to manage VMs in a computer network 502. The VM analysis engine 510 obtains performance characteristics 516 from a data recorder of a VM executing a particular program. The VM analysis engine 510 determines a particular set of values for VM startup parameters 522 based on the performance characteristics 516. The network manager 512 initiates VMs for executing the particular program using the particular set of values for the VM startup parameters 522. Examples of operations for initiating a VM using a modified VM startup parameter is described below with reference to FIG. 6.

4. Tuning a Virtual Machine Startup Parameter

Figure 6:
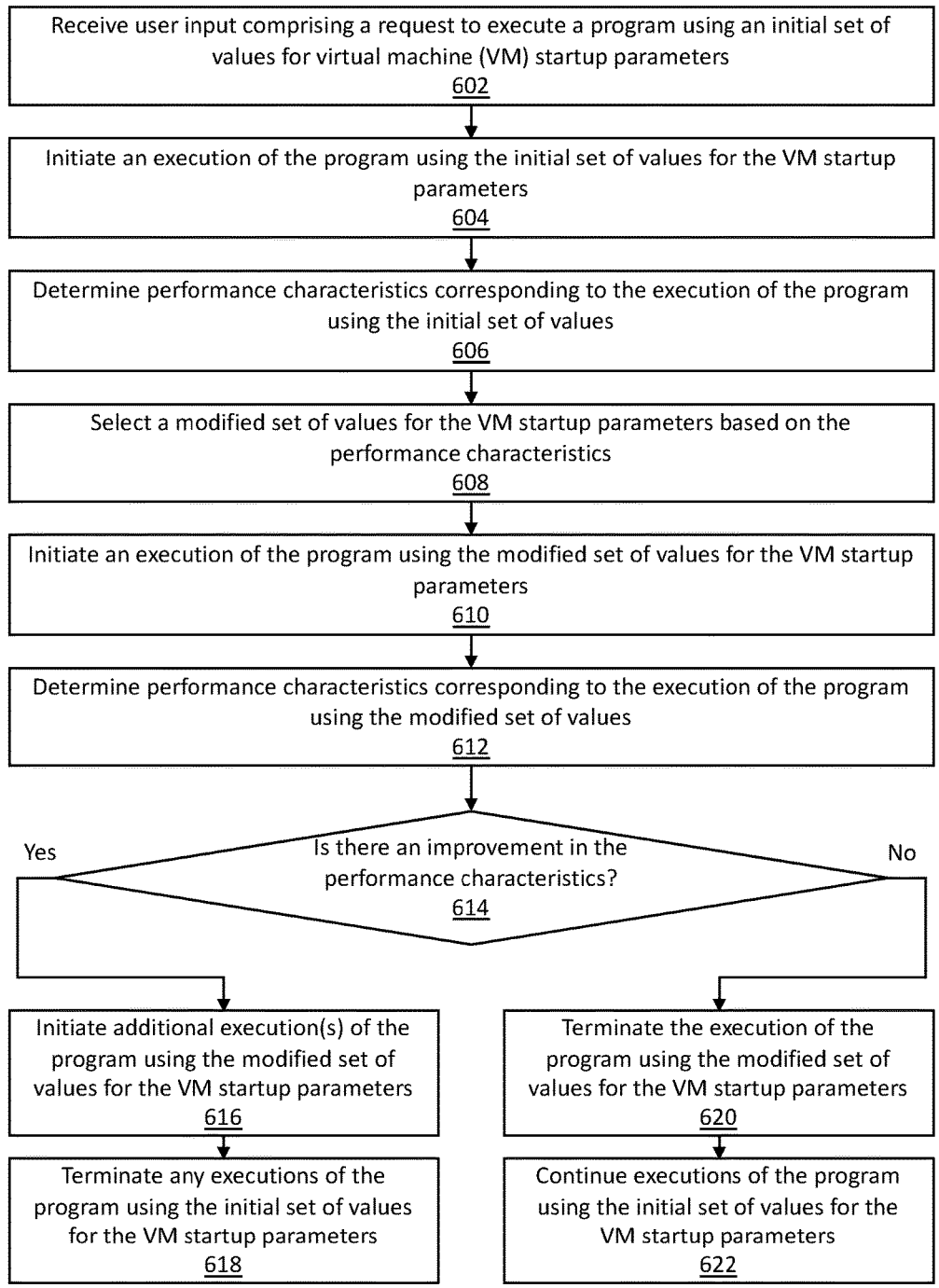
FIG. 6 illustrates an example set of operations for tuning a virtual machine (VM) startup parameter in accordance with one or more embodiments.

FIG. 6 illustrates an example set of operations for tuning a virtual machine (VM) startup parameter, in accordance with one or more embodiments.

One or more embodiments include receiving user input comprising a request to execute a program using an initial set of values for VM startup parameters (Operation 602). The user input may be received as command line parameters via a user interface. Alternatively, default values may be used for the VM startup parameters.

One or more embodiments include initiating an execution of the program using the initial set of values for the VM startup parameters (Operation 604). A network manager initiates a VM, for execution of the program, using the initial set of values for the VM startup parameters. The network manager configures the VM using the initial set of values for the VM startup parameters. The network manager initiates execution of the program on the VM.

The network manager identifies traffic, from one or more client devices and/or other devices, requesting computing services of the program. The network manager directs the traffic to the VM that is using the initial set of values for the VM startup parameters. The VM receives the request for computing services of the program. The VM executes the program to serve the request. The VM may return a response to the requesting device.

One or more embodiments include determining performance characteristics corresponding to the execution of the program using the initial set of values (Operation 606). A data recorder collects runtime information regarding the VM and the execution of the program on the VM. The information may be collected during the execution of the program. Information collected may include the errors, exceptions, and/or warnings generated. Additionally or alternatively, information collected may include an amount of memory in a heap, method area, stack, code cache, and/or generation region used by the program. Additionally or alternatively, information collected may include the frequency of garbage collections, a duration of each garbage collection process, and/or an amount of time used for garbage collection during execution of the program. Additionally or alternatively, information collected may include user-defined data, or any other data associated with the execution of the program. The runtime information constitute performance characteristics corresponding to the execution of the program using the initial set of values. The performance characteristics are used in selecting a modified set of values for the VM startup parameters.

In an embodiment, a set of VMs are initiated, for executing the program, using the initial set of values for the VM startup parameters. One or more data recorders collect runtime information regarding each VM and the execution of the program on each VM. The runtime information regarding each VM is compiled into a set of aggregated performance characteristics. The compilation of runtime information regarding each VM may include averaging the runtime information, determining a trend of the runtime information, and/or applying other statistical analysis on the runtime information. The aggregated performance characteristics may be used in selecting a modified set of values for the VM startup parameters.

One or more embodiments include selecting a modified set of values for the VM startup parameters based on the set of performance characteristics (Operation 608). A VM analysis engine identifies one or more rules to be applied to the performance characteristics determined at Operation 606.

In an embodiment, the applicable rules are identified based on a user-specified performance goal. As an example, performance goals available for user selection may include: (a) maximizing responsiveness of a program, or (b) maximizing throughput of a program. If maximizing responsiveness is selected, a VM analysis engine may select a first set of rules. If maximizing throughput is selected, the VM analysis engine may select a second set of rules. Different performance characteristics may be analyzed by the first and second sets of rules. The first set of rules may analyze, for example, whether errors relating to the code cache were generated. The second set of rules may analyze, for example, the frequency and duration of garbage collections.

The VM analysis engine applies the rules to the performance characteristics. The rules for determining a value for a VM startup parameter may be threshold-based. As an example, a rule may compare a particular performance characteristic to a threshold value. If the particular performance characteristic is below the threshold value, the rule may specify a particular value for a VM startup parameter. If the particular performance characteristic is above the threshold value, the rule may specify a different value for the VM startup parameter. Additionally or alternatively, the rules for determining a value for a VM startup parameter may be based on a mapping corresponding to the performance characteristics. Additionally or alternatively, the rules for determining a value for a VM startup parameter may be based on an initial value, for the VM startup parameter, identified at Operation 602.

As an example, a rule may be used to set a heap size. The rule may obtain information indicating a particular amount of memory used during the execution of the program. The rule may set the value for the heap size to be equal to the particular amount of memory.

As another example, a rule may be used to set a code cache size. The rule may include determining a frequency of an overflow of a code cache during the execution of the program. If the frequency is above a threshold value, the rule may specify an increase in the value of the code cache size.

As another example, a rule may be used to set a code cache size. The rule may include determining the maximum code cache used during the execution of the program. The rule may resize (increase or decrease) the code cache to be within a certain percentage of the maximum code cache used. Additionally or alternatively, the rule may include determining an aggregate measurement (such as, average, maximum, minimum) of the code cache used during the execution of the program. The rule may resize the code cache based on the aggregate measurement of the code cache used.

As another example, a rule may be used to set a generation size. The rule may determine statistics relating to the promotion of objects from the young generation to the old generation. If the number of objects promoted and/or the frequency of promotion is above a threshold value, the rule may specify an increase in the generation size of the young generation.

The VM analysis engine selects the modified values for the VM startup parameters independent of user input. The VM analysis engine does not use any user input specifying values for the VM startup parameters. Meanwhile, other types of user input may optionally be received. The VM analysis engine may obtain a user-specified performance goal that is used to identify applicable rules. The VM analysis engine may obtain user input that triggers operations for selecting modified values for the VM startup parameters. However, user input specifying a particular value for a VM startup parameter is not obtained.

One or more embodiments include initiating an execution of the program using the modified set of values for the VM startup parameters (Operation 610). The network manager initiates a VM, for execution of the program, using the modified set of values for the VM startup parameters. The network manager configures the VM using the modified set of values for the VM startup parameters. The network manager initiates execution of the program on the VM.

The network manager may operate in at least two modes. In an automatic mode, the network manager initiates the VM using the modified set of values independent of user input. As an example, the VM analysis engine may transmit the modified set of values to the network manager. The initiation of the VM, by the network manager, may be triggered by the receipt of the modified set of values without any user input.

Alternatively, in a user-confirmation mode, the network manager may initiate the VM using the modified set of values after receiving user input confirming the modified set of values. As an example, the network manager may present, at a user interface, the modified set of values obtained from the VM analysis engine. The network manager may receive user input selecting, confirming, and/or further modifying the modified set of values for the VM startup parameters via the user interface.

The network manager identifies traffic, from one or more client devices and/or other devices, requesting computing services of the program. The network manager redirects the traffic from (a) the VM that is using the initial set of values for the VM startup parameters to (b) the newly-initiated VM that is using the modified set of values for the VM startup parameters. The newly-initiated VM receives the request for computing services of the program. The newly-initiated VM executes the program to serve the request. The newly-initiated VM may return a response to the requesting device.

In an embodiment, the execution of the program on one VM using an initial set of values for the VM startup parameters and the execution of the program on another VM using a modified set of values for the VM startup parameters are performed concurrently. The network manager identifies traffic, from one or more client devices and/or other devices, requesting computing services of the program. The network manager directs a subset of the traffic to the VM that is using the initial set of values for the VM startup parameters. The network manager directs another subset of the traffic to the VM that is using the modified set of values for the VM startup parameters.

One or more embodiments include determining performance characteristics corresponding to the execution of the program using the modified set of values (Operation 612). A data recorder collects runtime information regarding the VM and the execution of the program on the VM. Examples of operations for determining performance characteristics are described above with reference to Operation 606. However, the data recorder performing Operation 606 and the data recorder performing Operation 612 may be different. The data recorder performing Operation 606 may be a data recorder that is associated with the VM that is using the initial set of values for the VM startup parameters. The data recorder performing Operation 612 may be a data recorder that is associated with the VM that is using the modified set of values for the VM startup parameters.

One or more embodiments include determining whether there is an improvement between (a) the performance characteristics corresponding to the execution of the program using the initial set of values and (b) the performance characteristics corresponding to the execution of the program using the modified set of values (Operation 614). The VM analysis engine compares the performance characteristics determined at Operation 606 and the performance characteristics determined at Operation 612. The VM analysis engine determines whether there is an improvement from using the initial set of values to using the modified set of values for the VM startup parameters.

As an example, the performance characteristics corresponding to the execution of the program using the initial set of values may include the generation of a heap overflow error. The performance characteristics corresponding to the execution of the program using the modified set of values may not include any generation of a heap overflow error. A VM analysis engine may determine that the execution of the program using the modified set of values is an improvement over the execution of the program using the initial set of values.

In an embodiment, the VM analysis engine compares the performance characteristics based on a user-specified performance goal. The VM analysis engine assigns a greater weight to a performance characteristic that is related to the user-specified performance goal.

As an example, performance goals available for user selection may include: (a) maximizing responsiveness of a program, or (b) maximizing throughput of a program.

Continuing the example, the performance characteristics corresponding to the execution of the program using the initial set of values may include: (a) a throughput of 50%, and (b) a maximum pause time of 300 ms. The performance characteristics corresponding to the execution of the program using the modified set of values may include: (a) a throughput of 70%, and (b) a maximum pause time of 500 ms.

Continuing the example, if a user selects responsiveness as the performance goal, then a VM analysis engine may assign a greater weight to the performance characteristic relating to pause time and/or latency. Since the execution of the program using the initial set of values has a lesser pause time, the VM analysis engine may determine that there is no improvement in the performance characteristics.

Continuing the example, if a user selects throughput as the performance goal, then the VM analysis engine may assign a greater weight to the performance characteristic relating to throughput. Since the execution of the program using the modified set of values has a greater throughput, the VM analysis engine may determine that there is an improvement in the performance characteristics.

If there is an improvement in the performance characteristics, then one or more additional executions of the program are initiated using the modified set of values for the VM startup parameters (Operation 616).

The network manager initiates additional VMs, for execution of the program, using the modified set of values for the VM startup parameters. The network manager directs and/or redirects traffic requesting computing services from the program to the additional VMs. Examples of operations for initiating a VM and directing traffic to the VM are described above with reference to Operation 610.

One or more embodiments include terminating any executions of the program using the initial set of values for the VM startup parameters (Operation 618). The network manager redirects traffic from (a) VMs that are using the initial set of values to (b) VMs that are using the modified set of values. The network manager terminates VMs that are using the initial set of values, including the VM that was initiated at Operation 604.

In an embodiment, Operations 616 and 618 are executed contemporaneously. Operation 616 includes initiating multiple VMs using the modified set of values. Operation 618 begins after at least one new VM is initiated. Initiating new VMs using the modified set of values may be performed at the same time as terminating VMs that are using the initial set of values. As an example, after a particular new VM is initiated using the modified set of values, redirection of traffic from (a) an existing VM using the initial set of values to (b) the particular new VM may begin. After the traffic is redirected, the existing VM may be terminated. After the existing VM is terminated, an additional new VM may be initiated using the modified set of values. Traffic may be redirected from (a) an existing VM using the initial set of values to (b) the additional new VM. The existing VM may be terminated.

In an embodiment, after Operation 618 is performed, Operations 606-618 may be reiterated to further tune the VM startup parameters. The "modified set of values" at Operation 616 becomes the "initial set of values" during the reiteration of Operation 606. The "initial set of values" at Operation 606 is a set of values, for the VM startup parameters, used at a previous iteration of Operation 616.

If there is no improvement in the performance characteristics, then any executions of the program using the modified set of values for the VM startup parameters are terminated (Operation 620). The network manager redirects all traffic from (a) VMs that are using the modified set of values to (b) VMs that are using the initial set of values. The network manager terminates VMs that are using the modified set of values, including the VM that was initiated at Operation 610.

One or more embodiments include continuing executions of the program using the initial set of values for the VM startup parameters (Operation 622). The network manager continues execution of VMs that are using the initial set of values. The network manager may initiate new VMs, for execution of the program, using the initial set of values for the VM startup parameters.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 7A:
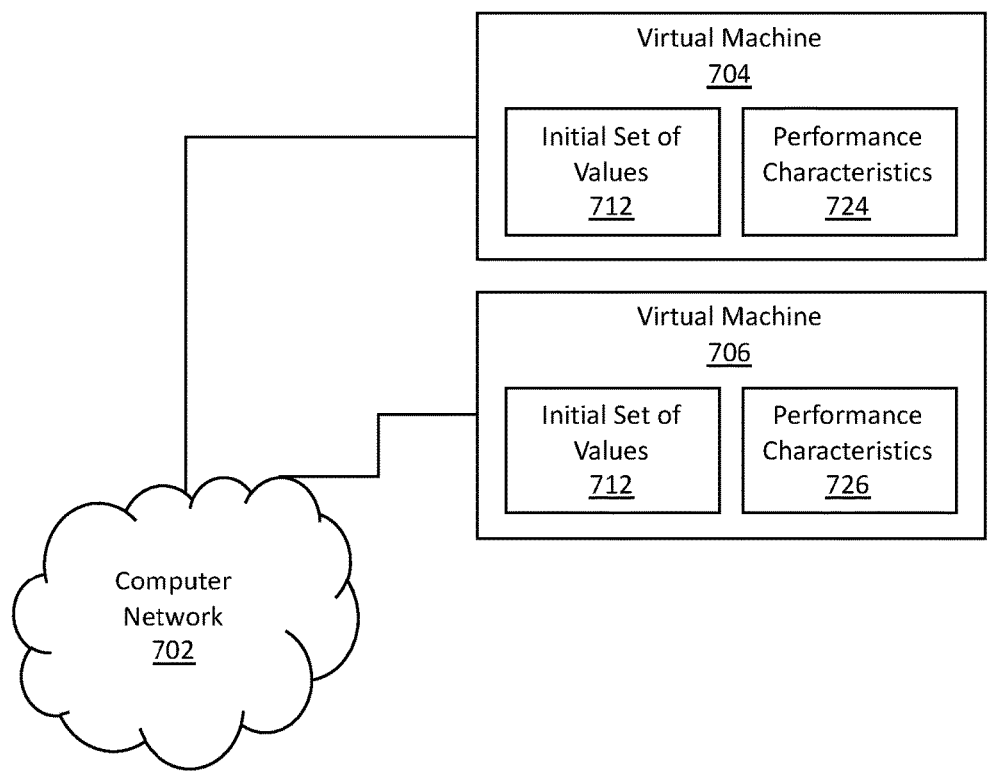
FIGS. 7A-C illustrate an example for tuning a VM startup parameter in accordance with one or more embodiments.
Figure 7B:
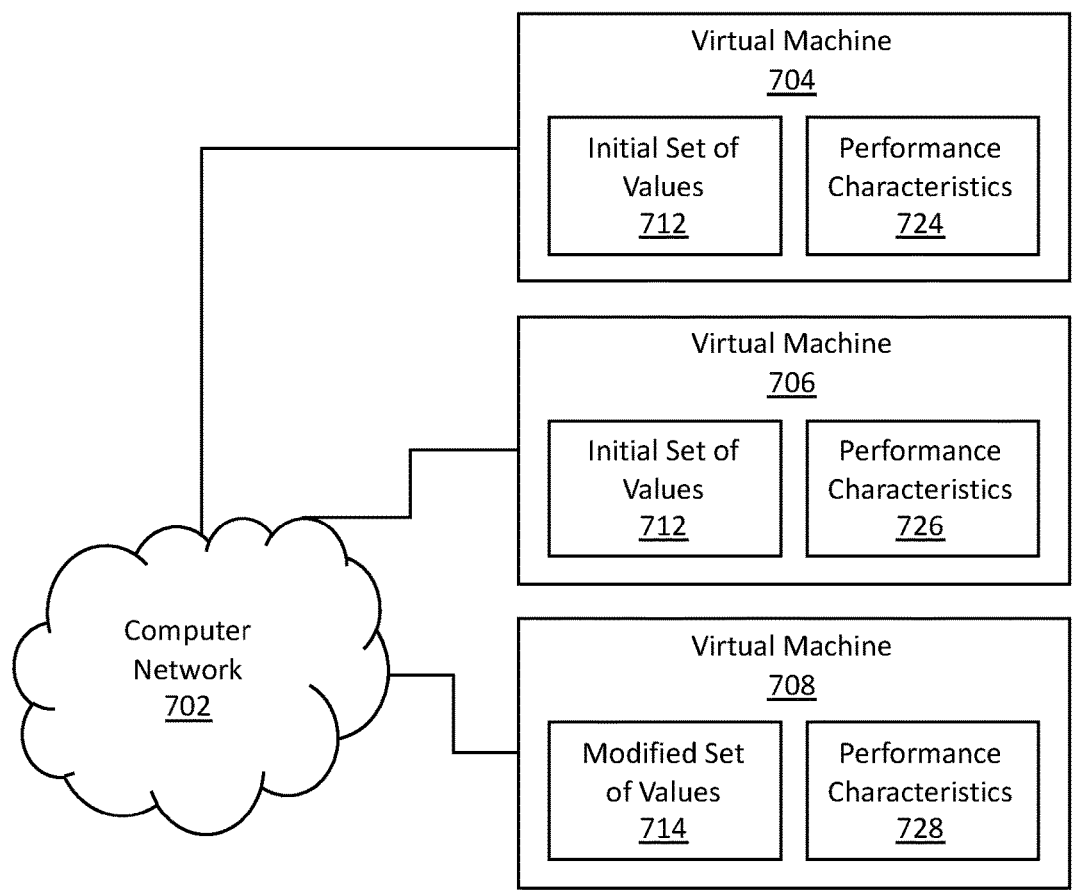
Figure 7C:
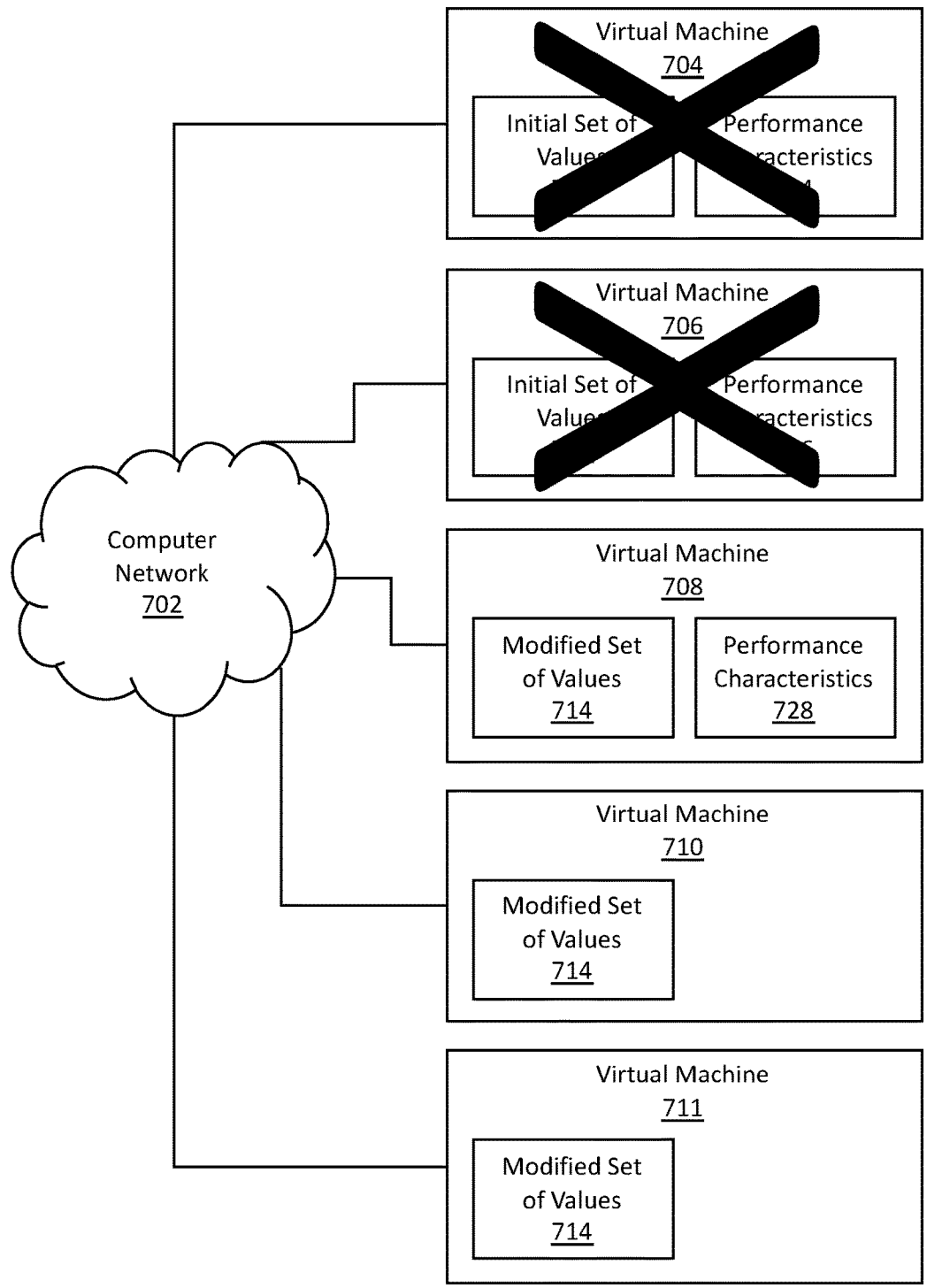

FIGS. 7A-C illustrate an example for tuning a VM startup parameter in accordance with one or more embodiments.

Referring to FIG. 7A, a network manager, associated with a computer network 702, receives user input comprising a request to execute a program using an initial set of values 712 for a set of VM startup parameters. The initial set of values for the VM startup paramters include setting a heap size of 20 TB.

The network manager initiates a virtual machine 704, for executing the program, using the initial set of values 712. The network manager also initiates a virtual machine 706, for executing the program, using the initial set of values 712. The virtual machines 704-706 are executed on machines included in the computer network 702. The virtual machines 704-706 are in communication with one or more client devices and/or other devices that request the computing services of the program.

A data recorder, associated with the virtual machine 704, determines performance characteristics 724 corresponding to the execution of the program on the virtual machine 704. The data recorder collects runtime information regarding the virtual machine 704 and the execution of the program on the virtual machine 704. The runtime information indicates that three heap-related errors were generated. Each heap-related error indicates that the amount of memory needed for execution of the program exceeded the heap size.

Additionally, a data recorder, associated with the virtual machine 706, determines performance characteristics 726 corresponding to the execution of the program on the virtual machine 706. The data recorder collects runtime information regarding the virtual machine 706 and the execution of the program on the virtual machine 706. The runtime information indicates that five heap-related errors were generated. Each heap-related error indicates that the amount of memory needed for execution of the program exceeded the heap size.

Based on the runtime information associated with the virtual machines 704-706, aggregated performance characteristics are generated. The aggregated performance characteristics indicate that an average of four heap-related errors were generated.

A VM analysis engine selects a modified set of values 714 for the VM startup parameters based on the aggregated performance characteristics. The VM analysis engine identifies a rule that provides that, if the number of heap-related errors is greater than three, then the heap size should be increased by 10%.

The VM analysis engine determines that the heap size during the previous execution was set to 20 TB. The VM analysis engine determines that increasing the heap size by 10% results in a new heap size of 22 TB. Hence, the modified set of values 714 for the VM startup parameters include setting a heap size of 22 TB.

Referring to FIG. 7B, the network manager obtains the modified set of values from the VM analysis engine. The network manager initiates a virtual machine 708, for executing the program, using the modified set of values 714. The network manager identifies traffic between a client device and the virtual machine 704. The network manager redirects a subset of the traffic from the virtual machine 704 to the virtual machine 708.

A data recorder, associated with virtual machine 708, determines performance characteristics 728 corresponding to the execution of the program on the virtual machine 708. The data recorder collects runtime information regarding the virtual machine 708 and the execution of the program on the virtual machine 708. The runtime information indicates that two heap-related errors were generated. Each heap-related error indicates that the amount of memory needed for execution of the program exceeded the heap size.

The VM analysis engine compares (a) the aggregated performance characteristics, associated with the initial set of values 712, and (b) the performance characteristics 728, associated with the modified set of values 714. The VM analysis engine determines that the number of heap-related errors has decreased. The VM analysis engine determines that there is an improvement to the performance characteristics.

Referring to FIG. 7C, the network manager executes additional virtual machines 710-711, for executing the program, using the modified set of values 714 for the VM startup parameters. The network manager also terminates the virtual machines 704-706, associated with the initial set of values 712 for the VM startup parameters. The initiation of new virtual machines and the termination of old virtual machines may be performed in parallel. As an example, the network manager may initiate the virtual machine 710. The network manager may redirect traffic from the virtual machine 704 to the virtual machine 710. At the same time, the network manager may initiate the virtual machine 711. While the virtual machine 711 is initiating, the network manager may terminate the virtual machine 704. The network manager may then redirect traffic from the virtual machine 706 to the virtual machine 711. The network manager may terminate the virtual machine 706. Each of the virtual machines 708-711 is associated with a heap size of 22 TB.

As illustrated in this example, the VM analysis engine tunes the VM startup parameters without user input specifying modified values for the VM startup parameters. The VM startup parameters are tuned based on the performance characteristics corresponding to an execution of the program using a particular set of values for the VM startup parameters. New virtual machines are initiated using the modified values for the VM startup parameters.

6. Computer Networks

In one or more embodiments, a computer network, such as a cloud computing network, provides a pool of resources that is shared amongst multiple client devices. The pool of resources may be geographically centralized and/or distributed. Examples of resources include a processor, a server, a data storage device, a virtual machine (VM), a platform, and/or a software application. Client devices may independently request computing services, such as server time and network storage space, as needed. The resources may be dynamically assigned to the requests and/or client devices on an on-demand basis. The resources assigned to each particular client device may be scaled up or down based on the computing services requested by the particular client device. The resources assigned to each particular client device may also be scaled up or down based on the aggregated demand for computing services requested by all client devices.

In an embodiment, client devices may be physical and/or virtual devices. The client devices may be any type of computing devices, such as computers or smartphones, executing any type of operating system. The client devices may be local to or remote from the resources of a computer network. The client devices may access the resources via a private network, the Internet, or another network. The client devices communicate requests to the resources using a communications protocol, such as Hypertext Transfer Protocol (HTTP). The requests are communicated to the resources through an interface, such as a client interface (such as a web browser), a program interface, or an application programming interface (API).

In an embodiment, a cloud service provider provides a cloud environment to one or more cloud users. Various service models may be implemented by the cloud environment, including but not limited to Software-as-a-Service (SaaS), Platform-as-a-Service (PaaS), and Infrastructure-as-a-Service (IaaS). In SaaS, a cloud service provider provides cloud users the capability to use the cloud service provider's applications, which are executing on the cloud resources. In PaaS, the cloud service provider provides cloud users the capability to deploy onto the cloud resources custom applications, which are created using programming languages, libraries, services, and tools supported by the cloud service provider. In IaaS, the cloud service provider provides cloud users the capability to provision processing, storage, networks, and other fundamental computing resources provided in the cloud environment. Any arbitrary applications, including an operating system, may be deployed on the cloud resources.

In an embodiment, various deployment models may be implemented by a cloud environment, including but not limited to a private cloud, a public cloud, and a hybrid cloud. In a private cloud, cloud resources are provisioned for exclusive use by a particular group of one or more entities (the term "entity" as used herein refers to a corporation, organization, person, or other entity). The cloud resources may be located on the premises of one or more entities in the particular group, and/or at one or more remote off-premise locations. In a public cloud, cloud resources are provisioned for multiple entities (also referred to herein as "tenants" or "customers"). Each tenant is associated with one or more client devices for accessing the cloud resources. Several tenants may use a same particular resource, such as a server, at different times and/or at the same time. The cloud resources may be located at one or more remote off-premise locations, away from the premises of the tenants. In a hybrid cloud, the cloud environment comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, in a multi-tenant cloud computing network, each tenant may be independent from other tenants. For example, a business or operation of one tenant may be separate from a business or operation of another tenant. Each tenant may require different levels of computing services to be provided by the cloud computing network. Tenant requirements may include, for example, processing speed, amount of data storage, level of security, and/or level of resiliency.

In an embodiment, in a multi-tenant cloud computing network, tenant isolation is implemented. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In an embodiment, data sets corresponding to various tenants are stored as entries in a database. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In an embodiment, data sets corresponding to various tenants are stored in different databases or data structures. Each database or data structure is tagged with the tenant ID of the corresponding tenant. A request for access to a particular data set is tagged with the tenant ID of the tenant making the request. The tenant ID associated with the request is checked against the tenant ID associated with the database or data structure storing the data set to be accessed. If the tenant IDs are the same, then access to the database or data structure is permitted.

In an embodiment, a subscription list indicates which tenants have authorization to access which applications. For each application, a list of tenant IDs of each tenant having authorization to access the application is stored. A request for access to a particular application is tagged with the tenant ID of the tenant making the request. The tenant ID associated with the request is checked against the subscription list to determine whether the tenant is authorized to access the application. If the tenant ID associated with the request is included in the list of tenant IDs of tenants having authorization to access the application, then access to the application is permitted.

In an embodiment, data sets and virtual resources (e.g., virtual machines, application instances, and threads) corresponding to different tenants are isolated to tenant-specific overlay networks maintained by the cloud environment. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
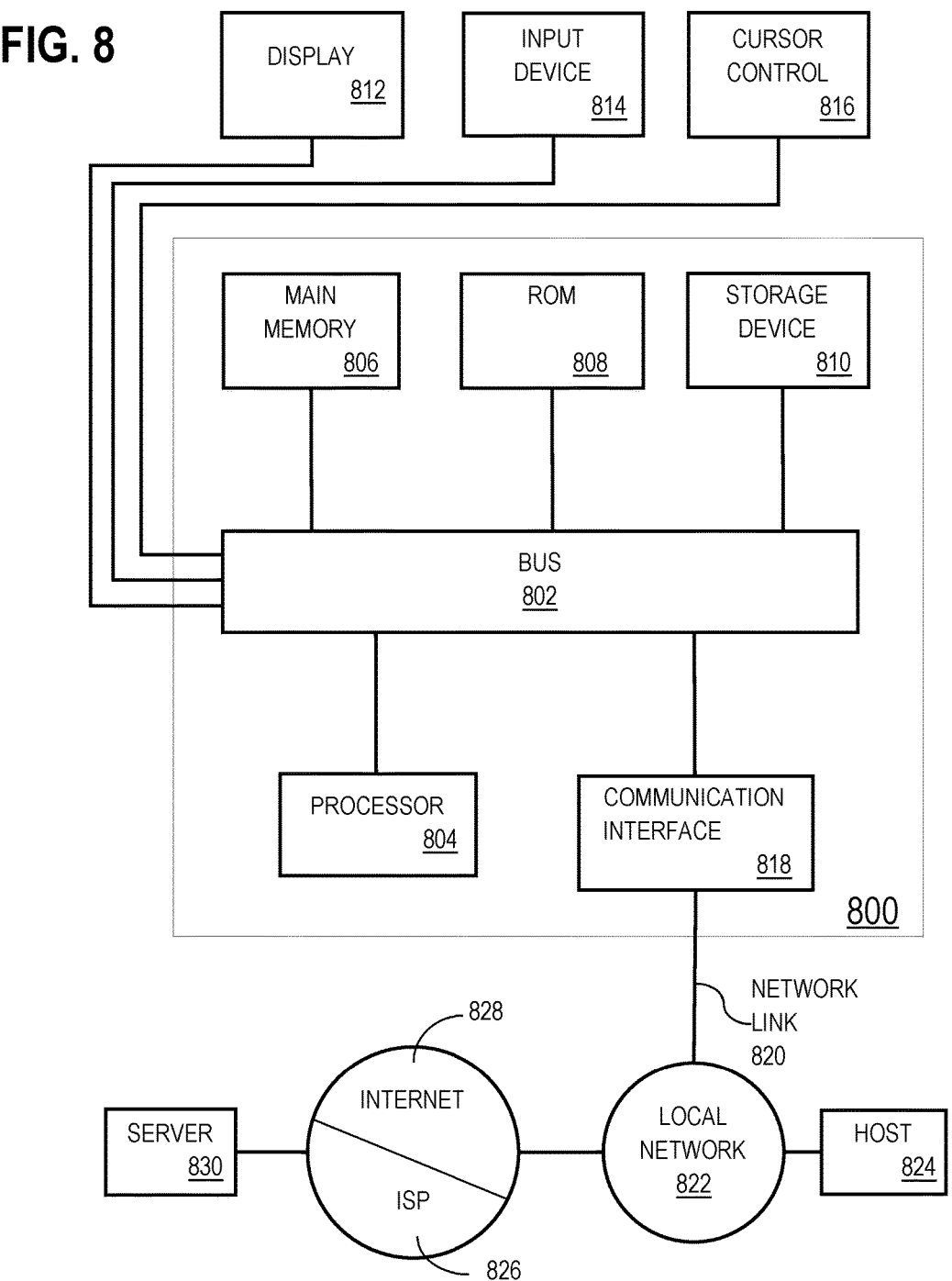
FIG. 8 illustrates a system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    initiating, by a network manager, a first execution of a program, on a first virtual machine (VM), using an initial set of values for one or more VM startup parameters;
    directing, by the network manager, at least a first portion of traffic that requests computing services of the program to the first VM;
    determining a first set of performance characteristics corresponding to the first execution;
    selecting a modified set of values for the VM startup parameters, different than the initial set of values for the VM startup parameters, based on the first set of performance characteristics;
    initiating, by the network manager, a second execution of the program, on a second VM, using the modified set of values for the VM startup parameters;
    redirecting, by the network manager, at least a first subset of the first portion of the traffic that requests computing services of the program from the first VM to the second VM;
    determining a second set of performance characteristics corresponding to the second execution;
    responsive to determining that the second set of performance characteristics comprises an improvement over the first set of performance characteristics:
        initiating, by the network manager, a third execution of the program, on a third VM, using the modified set of values for the VM startup parameters;
        directing, by the network manager, at least a second portion of the traffic that requests computing services of the program to the third VM.

2. The medium of claim 1, wherein the operations further comprise: prior to initiating the first execution of the program:
    receiving user input comprising a request to execute the program using the initial set of values for the VM startup parameters.

3. The medium of claim 2, wherein the modified set of values for the VM startup parameters are selected independent of user input.

4. The medium of claim 1, wherein selecting the modified set of values for the VM startup parameters based on the first set of performance characteristics comprises:
  selecting a set of one or more rules based on a user-specified performance goal; and
  applying the set of rules to the first set of performance characteristics to select the modified set of values for the VM startup parameters.

5. The medium of claim 1, wherein selecting the modified set of values for the VM startup parameters based on the first set of performance characteristics comprises:
  responsive to determining that a particular performance characteristic, of the first set of performance characteristics, is above a threshold value:
    determining at least one of the modified set of values for the VM startup parameters.

6. The medium of claim 1, wherein the first VM and the second VM are different.

7. The medium of claim 1, wherein determining that the second set of performance characteristics comprises the improvement over the first set of performance characteristics is based on a user-specified performance goal.

8. The medium of claim 1, wherein the VM startup parameters comprise one or more of the following: a heap size, a method area size, a stack size, a code cache size, a generation size, a garbage collection algorithm, and a page size.

9. The medium of claim 1, wherein the VM startup parameters comprise command line parameters specified via user input.

10. The medium of claim 1, wherein using the modified set of values for the VM startup parameters comprises:
  presenting the modified set of values for the VM startup parameters at a user interface;
  receiving user input selecting the modified set of VM startup parameters for use in the second execution of the program.

11. The medium of claim 1, wherein the second execution of program is initiated without being triggered by user input.

12. The medium of claim 1, wherein determining the first set of performance characteristics corresponding to the first execution is performed during the first execution of the program.

13. The medium of claim 1, wherein the operations further comprise:
  selecting a third set of values for the VM startup parameters, different than the modified set of values for the VM startup parameters, based on the second set of performance characteristics;
  initiating, by the network manager, a fourth execution of the program, on a fourth VM, using the third set of values for the VM startup parameters;
  directing, by the network manager, at least a third portion of the traffic that requests computing services of the program to the fourth VM;
  determining a third set of performance characteristics corresponding to the fourth execution;
  responsive to determining that the third set of performance characteristics does not comprise an improvement over the second set of performance characteristics:
    redirecting, by the network manager, the third portion of the traffic requesting computing services of the program from the fourth VM to at least one of the second VM and the third VM;
  terminating, by the network manager, the fourth VM.

14. The medium of claim 1, wherein the operations further comprise:
  further responsive to determining that the second set of performance characteristics comprises the improvement over the first set of performance characteristics:
    terminating the first execution of the program.

15. The medium of claim 1, wherein the first execution of the program uses a first heap associated with a first size, the second execution of the program uses a second heap associated with a second size different than the first size, and the first execution of the program and the second execution of the program are performed concurrently.

16. The medium of claim 1, wherein:
  determining the first set of performance characteristics comprises determining a particular amount of memory used for the first execution of the program; and
  selecting the modified set of values for the VM startup parameters comprises selecting a heap size equal to or greater than the particular amount of memory.

17. The medium of claim 1, wherein:
  the initial set of values for the VM startup parameters comprises a first code cache size;
  the first set of performance characteristics comprises an overflow of a code cache during the first execution of the program; and
  the modified set of values for the VM startup parameters comprises a second code cache size greater than the first code cache size.

18. The medium of claim 1, wherein the operations further comprise:
  redirecting, by the network manager, a second subset of the first portion of the traffic that requests computing services of the program from the first VM to the third VM.

19. The medium of claim 1, wherein the first set of performance characteristics comprises: an attribute associated with one or more garbage collection processes during execution of the program.

20. The medium of claim 1, wherein selecting the modified set of values for the VM startup parameters is further based on a percentage of the initial set of values for the VM startup parameters.

21. A method, comprising:
  initiating, by a network manager, a first execution of a program, on a first virtual machine (VM), using an initial set of values for one or more VM startup parameters;
  directing, by the network manager, at least a first portion of traffic that requests computing services of the program to the first VM;
  determining a first set of performance characteristics corresponding to the first execution;
  selecting a modified set of values for the VM startup parameters, different than the initial set of values for the VM startup parameters, based on the first set of performance characteristics;
  initiating, by the network manager, a second execution of the program, on a second VM, using the modified set of values for the VM startup parameters;
  redirecting, by the network manager, at least a first subset of the first portion of the traffic that requests computing services of the program from the first VM to the second VM;

determining a second set of performance characteristics corresponding to the second execution;
responsive to determining that the second set of performance characteristics comprises an improvement over the first set of performance characteristics:
   initiating, by the network manager, a third execution of the program, on a third VM, using the modified set of values for the VM startup parameters;
   directing, by the network manager, at least a second portion of the traffic that requests computing services of the program to the third VM;
wherein the method is performed by at least one device including a hardware processor.

22. A system comprising:
at least one device including a hardware processor; and
the system being configured to perform operations comprising:
   initiating, by a network manager, a first execution of a program, on a first virtual machine (VM), using an initial set of values for one or more VM startup parameters;
   directing, by the network manager, at least a first portion of traffic that requests computing services of the program to the first VM;
   determining a first set of performance characteristics corresponding to the first execution;
   selecting a modified set of values for the VM startup parameters, different than the initial set of values for the VM startup parameters, based on the first set of performance characteristics;
   initiating, by the network manager, a second execution of the program, on a second VM, using the modified set of values for the VM startup parameters;
   redirecting, by the network manager, at least a first subset of the first portion of the traffic that requests computing services of the program from the first VM to the second VM;
   determining a second set of performance characteristics corresponding to the second execution;
   responsive to determining that the second set of performance characteristics comprises an improvement over the first set of performance characteristics:
      initiating, by the network manager, a third execution of the program, on a third VM, using the modified set of values for the VM startup parameters;
      directing, by the network manager, at least a second portion of the traffic that requests computing services of the program to the third VM.

* * * * *

UNITED STATES PATENT AND TRADEMARK OFFICE
CERTIFICATE OF CORRECTION

PATENT NO. : 10,296,363 B2
APPLICATION NO. : 15/268432
DATED : May 21, 2019
INVENTOR(S) : Hirt et al.

Page 1 of 1

It is certified that error appears in the above-identified patent and that said Letters Patent is hereby corrected as shown below:

In the Specification

In Column 8, Line 18, delete "306" and insert -- 305 --, therefor.

In Column 9, Line 15, delete "306" and insert -- 305 --, therefor.

In Column 19, Line 60, delete "paramters" and insert -- parameters --, therefor.

Signed and Sealed this
Twenty-first Day of July, 2020

Andrei Iancu
*Director of the United States Patent and Trademark Office*